United States Patent
Bates et al.

(10) Patent No.: US 7,542,914 B1
(45) Date of Patent: Jun. 2, 2009

(54) METHOD FOR GENERATING AN INSURANCE QUOTE

(76) Inventors: David L. Bates, 9932 Springstone Rd., McCordsville, IN (US) 46055; Jerome B. Gordon, F Lalley Blvd., Fairfield, CT (US) 06430; Donald J. Goodenow, 1118 Greystone Manor Pkwy., Chesterfield, MO (US) 63005

( * ) Notice: Subject to any disclaimer, the term of this patent is extended or adjusted under 35 U.S.C. 154(b) by 952 days.

(21) Appl. No.: 09/579,407

(22) Filed: May 25, 2000

(51) Int. Cl.
*G06Q 40/00* (2006.01)
(52) U.S. Cl. .............................. 705/4; 705/38
(58) Field of Classification Search .................. 705/4, 705/38
See application file for complete search history.

(56) References Cited

U.S. PATENT DOCUMENTS

| | | | | |
|---|---|---|---|---|
| 4,876,648 A | * | 10/1989 | Lloyd | 705/38 |
| 5,239,462 A | * | 8/1993 | Jones et al. | 705/38 |
| 5,537,315 A | * | 7/1996 | Mitcham | 705/4 |
| 5,655,085 A | | 8/1997 | Ryan et al. | 364/401 |
| 5,806,042 A | * | 9/1998 | Kelly et al. | 705/4 |
| 5,907,828 A | | 5/1999 | Meyer et al. | 705/4 |
| 6,236,973 B1 | * | 5/2001 | Dillard | 705/4 |
| 6,263,320 B1 | * | 7/2001 | Danilunas et al. | 705/35 |
| 6,347,302 B1 | * | 2/2002 | Joao | 705/4 |

OTHER PUBLICATIONS

Dugas, Not the total solution Bankruptcy stays on credit reports, Aug. 1996, USA Today, pp. 1-2.*
Hielscher, Banking law gives telemarketers your data, Jan. 2000, Morning Star, p. 1E.*

* cited by examiner

*Primary Examiner*—C Luke Gilligan
*Assistant Examiner*—Lena Najarian
(74) *Attorney, Agent, or Firm*—Boyle Fredrickson, S.C.

(57) ABSTRACT

A method is provided for generating an insurance quote for an applicant for a loan. The method includes the steps of obtaining data from a lender. At least a portion of the data is provided to the lender by the applicant. An insurance risk is underwritten which responsive to the data and an insurance quote based thereon is provided to the applicant.

24 Claims, 5 Drawing Sheets

METHOD FOR GENERATING AN INSURANCE QUOTE

FIELD OF THE INVENTION

This invention relates to insurance policies, and in particular, to a method for generating an insurance quote for a customer utilizing information provided by the customer on a loan application.

BACKGROUND AND SUMMARY OF THE INVENTION

In order to purchase certain high-ticket items, such as a home, a car, a boat or the like, a consumer must often times obtain a loan from a financial institution. To obtain such a loan, the consumer must submit a loan application to the financial institution which, in turn, evaluates the customer's ability to repay the loan. Typically, a financial institution will require insurance of the collateral, i.e. the home, the car or the boat, in order to grant the loan.

Heretofore, it has been recognized that a consumer will only purchase insurance when the consumer perceives a need for the product. Further, most consumers do not expend a substantial amount of time or effort evaluating the differences among the insurance offerings of different companies. When required to purchase the insurance by a financial institution, the consumer will usually contact a minimal number of insurance companies and select a policy therefrom. As a result, consumers often obtain insurance coverage which does not fully meet their needs.

In view of the foregoing, insurance companies tend to expend a substantial amount of time and effort in order to obtain new policy holders. The insurance companies are constantly trying to sell products to consumers who do not see a compelling reason to purchase the product at the time the insurance company is attempting to sell the policy to them. As a result, insurance companies spend a substantial amount of money to obtain new policy holders, and as such, the cost of the policies sold by such insurance companies increases.

Therefore, it is a primary object and feature of the present invention to provide a method for generating an insurance quote for a consumer which allows an insurance provider to contact the consumer only at such point when the consumer needs insurance.

It is a further object and feature of the present invention to provide a method of generating an insurance quote for a consumer wherein the insurance provider has access to the maximum amount of information needed from the consumer to provide the best possible risk analysis for the insurance policy.

It is a still further object of the present invention to provide a method for generating an insurance quote which minimizes the solicitation and the analysis costs for the insurance provider.

It is a still further object and feature of the present invention to provide a method for generating an insurance quote for a consumer which minimizes the effort required of the consumer to obtain such quote.

It is a still further object and feature of the present invention to provide a method for generating an insurance quote for a consumer which may be provided to the consumer as quickly as possible.

It is still a further object and feature of the present invention to provide a method of generating an insurance quote for a consumer which allows for additional insurance quotes to be provided by a provider in response to further requests by the consumer.

In accordance with the present invention, a method is provided for generating an insurance quote in connection with obtaining a loan. The method includes the steps of obtaining data from a lender. At least a portion of the data is provided to the lender by the applicant. The insurance risk is underwritten responsive to the data and an insurance quote is provided to the applicant.

It is contemplated that the insurance quote be provided by the lender, or alternatively, by an insurance provider. The step of underwriting the insurance risk may include the additional step of providing a plurality of insurance companies for underwriting the insurance risk and determining a set of terms for each of a plurality of insurance companies for which those insurance companies would accept the insurance risk. One of the sets of terms may be selected and the insurance quote be provided in response thereto.

If any additional data is needed prior to underwriting an insurance risk, the additional data may be obtained from the applicant. After providing the insurance quote, the data is stored such that an additional insurance quote may be provided in the future in response to a request by the applicant. It is contemplated to obtain permission from the applicant prior to obtaining the data from the lender or prior to generating the insurance quote. It is noted that the data may also be obtained from a third party such as a credit bureau.

In accordance with a still further aspect of the present invention, a method is provided for generating an insurance quote for an applicant for a loan. The method includes the steps of obtaining data from a lender. At least the first portion of the data is provided to the lender by the applicant in applying to obtain the loan. An insurance risk is underwritten responsive to the data for a plurality of insurance companies. One of the plurality of the insurance companies is selected in response to the underwriting. An insurance quote is provided to the applicant from the selected insurance company.

The insurance quote may be provided by the lender, or alternatively, by an insurance provider. The step of underwriting the insurance risk may include the additional step of determining the sets of terms for each of the plurality of insurance companies under which each of the plurality of insurance companies will accept the insurance risk. If additional data is needed prior to underwriting the insurance risk, the insurance data may be obtained from the applicant. After providing the insurance quote, the data is stored so as to allow additional insurance quotes to be provided to the applicant upon request. Prior to obtaining or utilizing the data, permission is obtained from the applicant. It is also contemplated to obtain data from third parties such as a credit bureau.

In accordance with a still further aspect of the present invention, a method is provided for generating an insurance quote for an applicant for a loan. The method includes the steps of requesting permission from the applicant to obtain data from a lender. If permission is granted, the data is obtained from the lender. At least the first portion of the data is provided to the lender by the applicant in order to obtain the loan. If additional data is needed to underwrite the insurance risk, the additional data is obtained. The insurance risk is underwritten in response to data for a plurality of insurance companies. One of the plurality of the insurance companies is selected in response to the underwriting and an insurance quote is provided to the applicant from the selected insurance company. The data is stored after the insurance quote is provided in order that additional insurance quotes may be made to the applicant upon request.

It is contemplated that the insurance quote be provided by a lender, or alternatively, by an insurance provider. It is noted that the additional data may be obtained from a third party such as a credit bureau.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
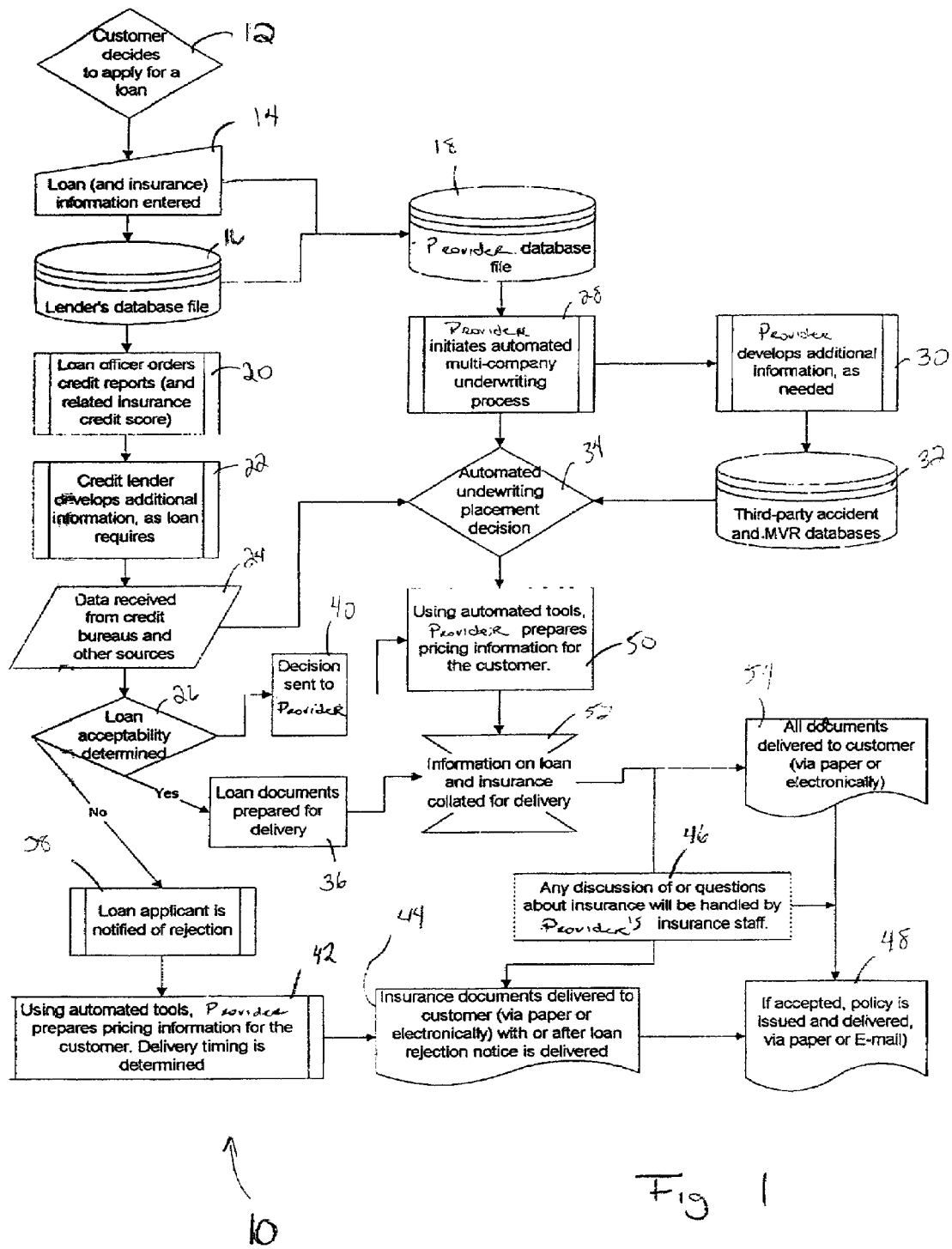
FIG. 1 is a flow chart of a first embodiment of the method of the present invention.

Referring to FIG. 1, a first embodiment of a method in accordance of the present invention is generally designated by the reference numeral 10. The method 10 is initiated when a customer decides to apply for a loan, block 12. The consumer will contact a financial institution and complete a corresponding loan application. As is known, the information required to be completed on a loan application is substantially identical to the information required on an insurance application. As heretofore described, the customer is often required to obtain insurance as a condition to obtaining the loan. As such, permission is obtained from the customer to utilize the data on the loan application in order to generate an insurance quote for the customer. Permission may be obtained directly from the consumer or as part of the general authorization obtained as part of the loan application process.

The loan, and hence insurance, data/information is entered, block 14, and downloaded into the potential lender's database file, block 16. If permission is obtained from the customer, the information may be downloaded into a providers database file, block 18, either directly or through the lender's database file.

As is conventional, a loan officer from the lender will order the necessary credit reports and their related insurance credit score, block 20. In addition, the credit lender will develop additional information as the loan requires, block 22. For example, a mortgage loan will require certain appraisals and/or inspections. An auto loan will require a vehicle valuation. Thereafter, the lender will receive data on the customer from various credit bureaus and other sources, block 24. Based upon the data in possession the lender, through its loan officer, determines the acceptability of the loan, block 26.

Using the information downloaded in the provider database file, the provider initiates an automated multi-company underwriting process, block 28. In other words, the provider utilizes electronic underwriting templates and rule-based underwriting to determine the amounts and on what terms each insurance company will accept the insurance risk. Simultaneously, the provider will develop additional information as needed to underwrite the insurance policy, block 30. For example, in an auto loan, the provider will obtain information on third party accident reports and the motor vehicle record of the customer, block 32. In addition, the provider will receive from the lender the data from the credit bureaus and other sources obtained as part of the loan application process. Utilizing the data obtained from the various sources, the provider underwrites the insurance risk, block 34.

If the loan is granted, the loan documents are prepared by the lender for delivery, block 36. If the loan is rejected, the customer is notified of the rejection, block 38. In any event, the decision of the lender is sent to the provider, block 40.

In the event that the loan is rejected, using the automated tools, the provider will still prepare pricing information for an insurance quote for the customer, block 42. Based upon the pricing and the underwriting, the provider selects one or more insurance companies from which the insurance quote[s] to the customer will be made. In addition, the provider will determine the timing for the delivery of the insurance quote[s]. The insurance documents containing the insurance quote are delivered to the customer via paper or electronically either with or after the loan rejection notice is delivered to the customer, block 44. Any discussion and/or questions about the insurance documents or the insurance quote will be handled by the provider's insurance staff, block 46. If the insurance quote is accepted, the insurance policy is issued and delivered to the customer via paper or email, block 48.

Alternatively, if the loan is granted, the provider utilizes the automated underwriting tools to prepare pricing information for the customer, block 50. Based upon the pricing and underwriting, the provider selects one or more insurance companies from which the insurance quote[s] to the customer will be made. Information on the accepted loan and the insurance quote are collated for delivery, block 52, and all the documents are delivered to the customer via paper or electronically, block 54. If the insurance quote is accepted by the customer, the insurance policy is issued and delivered to the customer via paper and email, block 48. As heretofore described, any discussion or questions about the insurance quote or the insurance policy will be handled by the provider's insurance staff, block 46.

Figure 2:
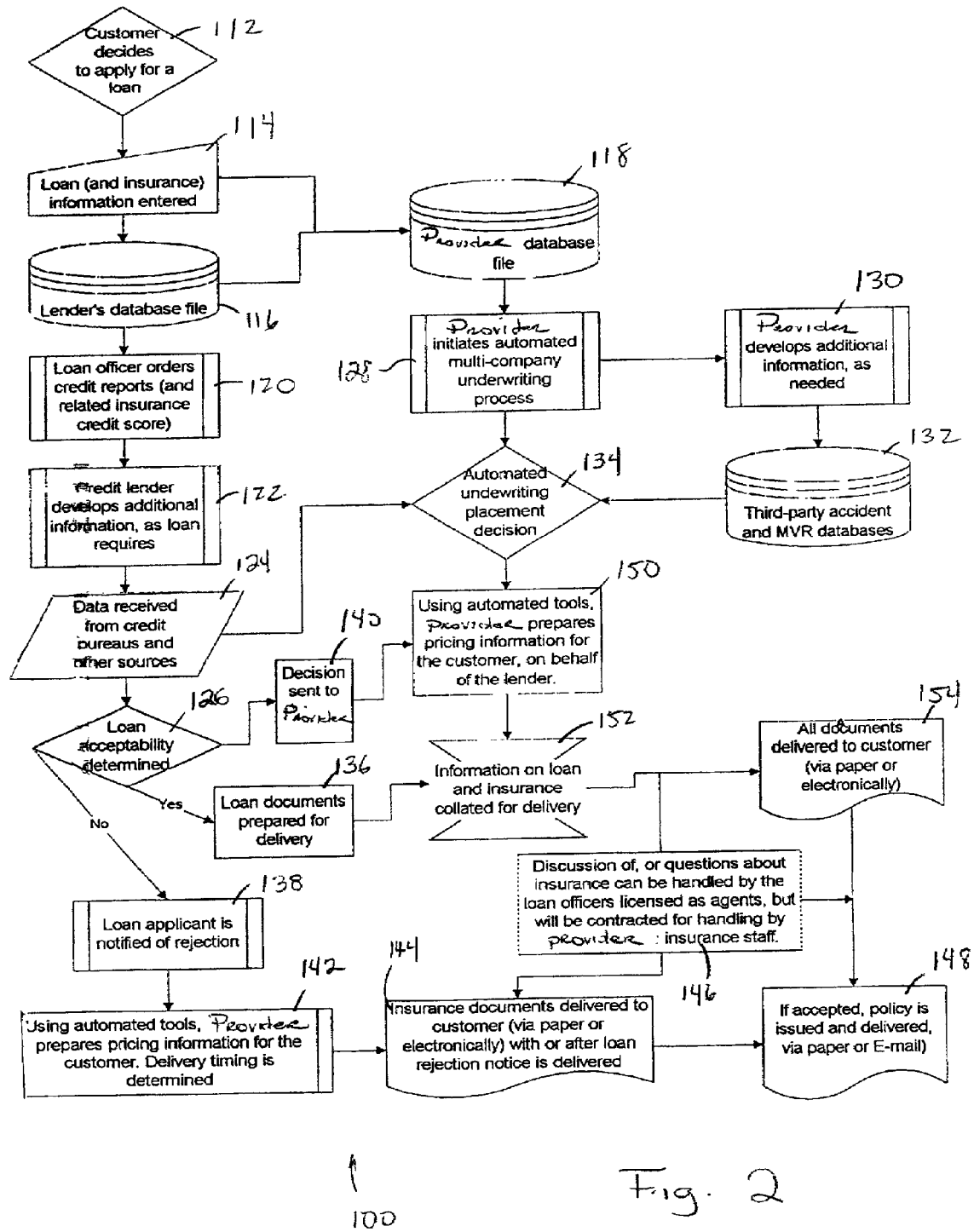
FIG. 2 is a flow chart of a second embodiment of the method of the present invention.

Referring to FIG. 2, a second embodiment of the method of the present invention is generally designated by the reference numeral 100. In certain applications, the financial institution/lender may wish to operate as the insurance agent. As such, the provider will establish the lender as the producing sub-agent and write the lender's business as the general agent. The provider will manage all aspects of the sub-agent's insurance processing on a contract basis.

Method 100 is initiated when a customer decides to apply for a loan, block 112. The consumer will contact a financial institution and complete a corresponding loan application. Permission is obtained from the customer to utilize the data on the loan application in order to generate an insurance quote for the customer. Permission may be obtained directly from the consumer or as part of the general authorization obtained as part of the loan application process.

The loan, and hence insurance, data/information is entered, block 114, and downloaded into the potential lender's database file, block 116. If permission is obtained from the customer, the information may be downloaded into a providers database file, block 118, either directly or through the lender's database file.

As is conventional, a loan officer from the lender will order the necessary credit reports and their related insurance credit score, block 120. In addition, the credit lender will develop additional information as the loan requires, block 122. For example, a mortgage loan will require certain appraisals and/or inspections. An auto loan will require a vehicle valuation.

Thereafter, the lender will receive data on the customer from various credit bureaus and other sources, block 124. Based upon the data in its possession, the lender through its loan officer determines the acceptability of the loan, block 126.

Using the information downloaded in the provider database file, the provider initiates an automated multi-company underwriting process, block 128. In other words, the provider utilizes electronic underwriting templates and rule-based underwriting to determine the amounts and on what terms each insurance company will accept the insurance risk. Simultaneously, the provider will develop additional information as needed to underwrite the insurance policy, block 130. For example, in an auto loan, the provider will obtain information on third party accident reports and the motor vehicle record of the customer, block 132. In addition, the provider will receive from the lender the data from the credit bureaus and other sources obtained as part of the loan application process. Utilizing the data obtained from the various sources, the provider underwrites the insurance risk, block 134.

If the loan is granted, the loan documents are prepared by the lender for delivery, block 136. If the loan is rejected, the customer is notified of the rejection, block 138. In any event, the decision of the lender is sent to the provider, block 140.

In the event that the loan is rejected, using the automated tools, the provider will still prepare pricing information for the customer on the insurance, block 142. Based upon the pricing and the underwriting, the provider selects one or more insurance companies from which the insurance quote[s] to the customer will be made. In addition, the provider will determine the timing for the delivery of the insurance quote. The insurance documents containing the insurance quote are delivered to the customer via paper or electronically either with or after the loan rejection notice is delivered to the customer, block 144. Any discussion of or questions about the insurance documents or the insurance quote may be handled the loan officers licensed as agents or by the provider's insurance staff under contract, block 146. If the insurance quote is accepted, the insurance policy is issued and delivered to the customer via paper or email, block 148.

Alternatively, if the loan is granted, the provider utilizes the automated underwriting tools to prepare pricing information for the customer, block 150. Based upon the pricing and the underwriting, the provider selects one or more insurance companies from which the insurance quote[s] to the customer will be made. Information on the accepted loan and the insurance quote are collated for delivery, block 152, and all the documents are delivered to the customer via paper or electronically, block 154. If the insurance quote is accepted by the customer, the insurance policy is issued and delivered to the customer via paper and email, block 148. As heretofore described, any discussion or questions about the insurance quote or the insurance policy may be handled the loan officers licensed as agents or by the provider's insurance staff under contract, block 146.

Figure 3:
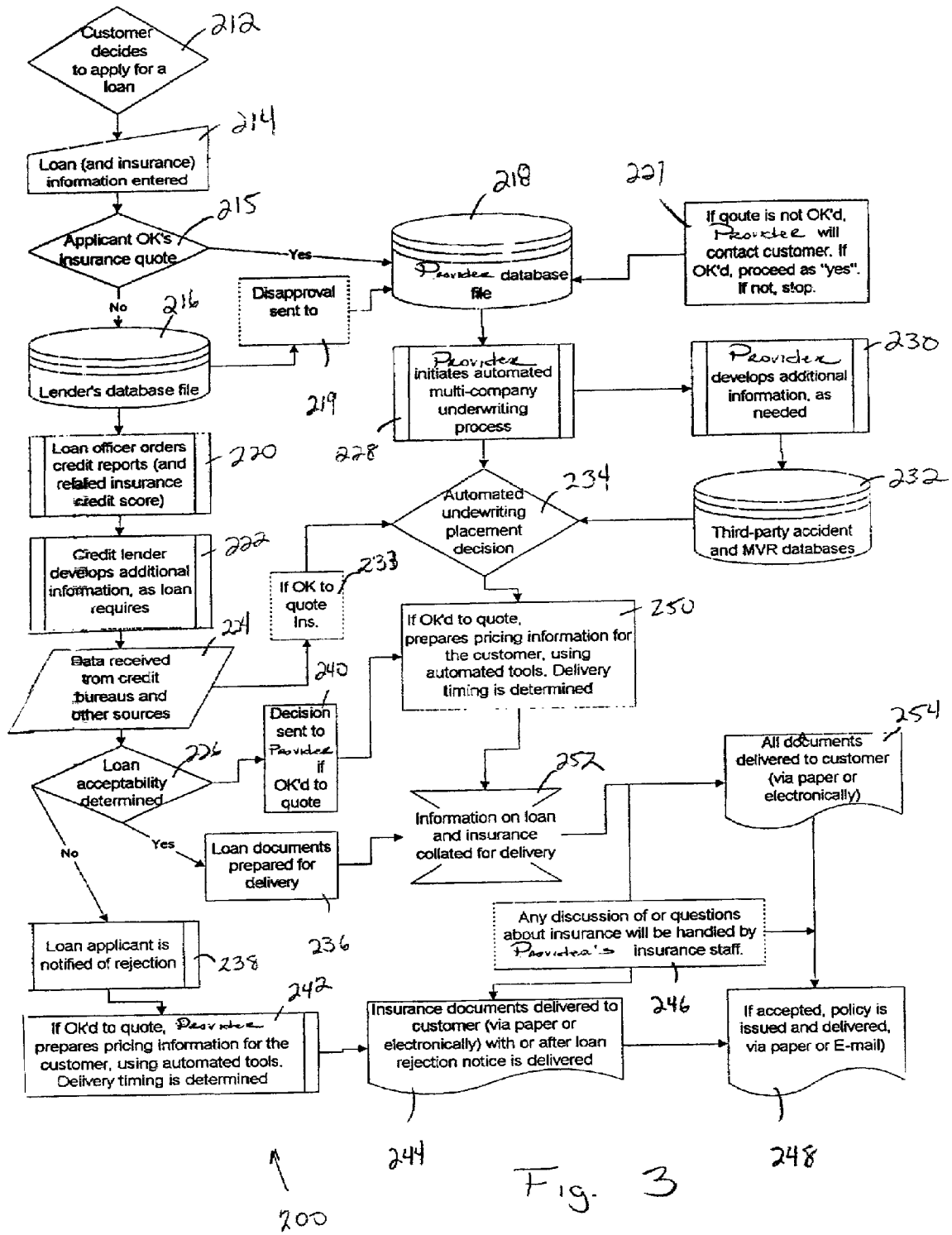
FIG. 3 is a third embodiment of the method in accordance with the present invention.

Referring to FIG. 3, a third alternate embodiment of the present invention is generally designated by the reference numeral 200. Method 200 is initiated when a customer decides to apply for a loan, block 212. The consumer will contact a financial institution and complete a corresponding loan application. The loan, and hence insurance, data/information is entered, block 214. Often times, the lender may wish to ask for a loan applicant's permission to provide insurance information, rather than to rely on a general authorization obtained as part of the loan process, block 215. The data/information is downloaded into the potential lender's database file, block 216, and if permission is obtained from the customer, the information may be downloaded into a provider's database file, block 218. If permission is not obtained from the customer, a disapproval notice is sent to the provider, block 219. Thereafter, the provider may seek approval directly from the customer, block 221. If approval is not obtained, method 200 will cease.

As is conventional, a loan officer from the lender will order the necessary credit reports and their related insurance credit score, block 220. In addition, the credit lender will develop additional information as the loan requires, block 222. For example, a mortgage loan will require certain appraisals and/or inspections. An auto loan will require a vehicle valuation. Thereafter, the lender will receive data on the customer from various credit bureaus and other sources, block 224. Based upon the data in its possession, the lender, through its loan officer, determines the acceptability of the loan, block 226.

Using the information downloaded in the provider database file, the provider initiates an automated multi-company underwriting process, block 228. In other words, the provider utilizes electronic underwriting templates and rule-based underwriting to determine the amounts and on what terms each insurance company will accept the insurance risk. Simultaneously, the provider will develop additional information as needed to underwrite the insurance policy, block 230. For example, in an auto loan, the provider will obtain information on third party accident reports and the motor vehicle record of the customer, block 232. In addition, if approval has been obtained from the customer, block 233, the provider will receive from the lender the data from the credit bureaus and other sources obtained as part of the loan application process. Utilizing the data obtained from the various sources, the provider underwrites the insurance risk, block 234.

If the loan is granted, the loan documents are prepared by the lender for delivery, block 236. If the loan is rejected, the customer is notified of the rejection, block 238. In any event, the decision of the lender is sent to the provider if permission from customer to obtain an insurance quote has been provided, block 240.

If the loan is rejected and if permission from customer to obtain an insurance quote has been provided, using the automated tools, the provider will still prepare pricing information for the insurance quote for the customer, block 242. Based upon the pricing and the underwriting, the provider selects one or more insurance companies from which the insurance quote[s] to the customer will be made. In addition, the provider will determine the timing for the delivery of the insurance quote. The insurance documents containing the insurance quote are delivered to the customer via paper or electronically either with or after the loan rejection notice is delivered to the customer, block 244. Any discussion of or questions about the insurance documents or the insurance quote will be handled by the provider's insurance staff, block 246. If the insurance quote is accepted, the insurance policy is issued and delivered to the customer via paper or email, block 248.

Alternatively, if the loan is granted and if permission from customer to obtain an insurance quote has been provided, the provider utilizes the automated underwriting tools to prepare pricing information for the customer, block 250. Based upon the pricing and the underwriting, the provider selects one or more insurance companies from which the insurance quote[s] to the customer will be made. Information on the accepted loan and the insurance quote are collated for delivery, block 252, and all the documents are delivered to the customer via paper or electronically, block 254. If the insurance quote is accepted by the customer, the insurance policy is issued and delivered to the customer via paper and email, block 248. As heretofore described, any discussion of or questions about the insurance documents or the insurance quote will be handled by the provider's insurance staff, block 246.

Figure 4:
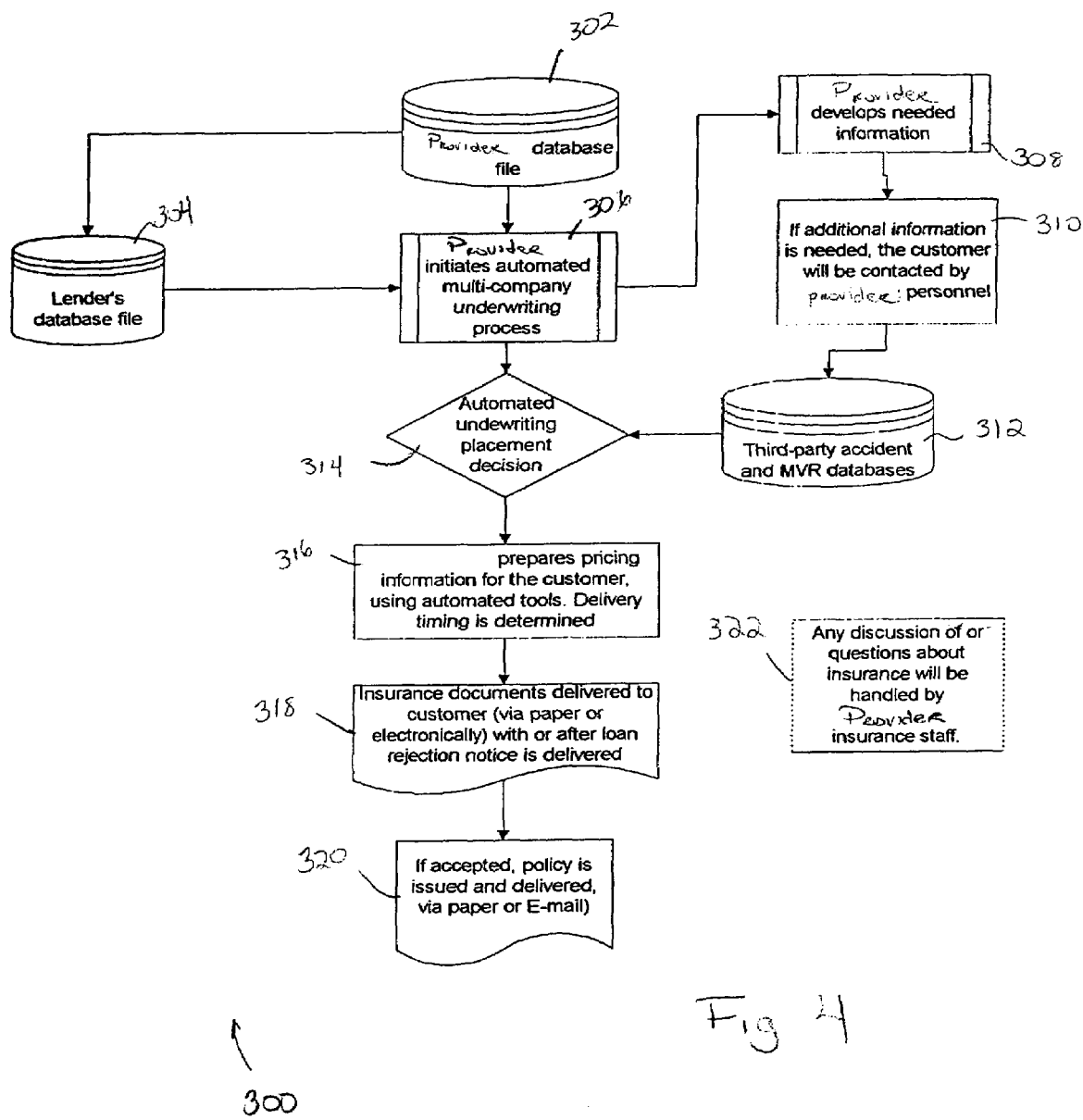
FIG. 4 is a flow chart of a fourth embodiment of the method of the present invention.

Referring to FIG. 4, a fourth embodiment of the method of the present invention is generally designated by the reference numeral 300. Referring to method 300, often times a lender will wish to have its current loan customers provided with insurance information. As such, the lender may rely on its loan application authorization to proceed with the data gathering and policy underwriting. Method 300 includes the step of the provider's database, block 302, contacting the lender's database file, block 304, in order to construct an insurance record needed to process the policy underwriting. The provider initiates the automated multi-company underwriting process, block 306, and develops the additional information needed to complete the underwriting process, block 308. For example, the provider may contact the customer directly, block 310, and/or access third party accident and motor vehicle record databases, block 312.

Utilizing the information gathered, the provider underwrites the insurance risk for each of the insurance companies, block 314, and thereafter, prepares pricing information for the customer using the automated tools, block 316. Based upon the pricing and the underwriting, the provider selects one or more insurance companies from which the insurance quote[s] to the customer will be made. The timing for delivering the insurance quote is determined, block 316, and the insurance documents are delivered to the customer, block 318, via paper or electronically. The insurance documents may be delivered with or after a decision on the loan is delivered to the customer. If the insurance quote is accepted, the insurance policy is issued and delivered to the customer via paper or email, block 320. Any discussion or questions about the insurance quote or the insurance policy will be handled by the provider insurance staff, block 322.

Figure 5:
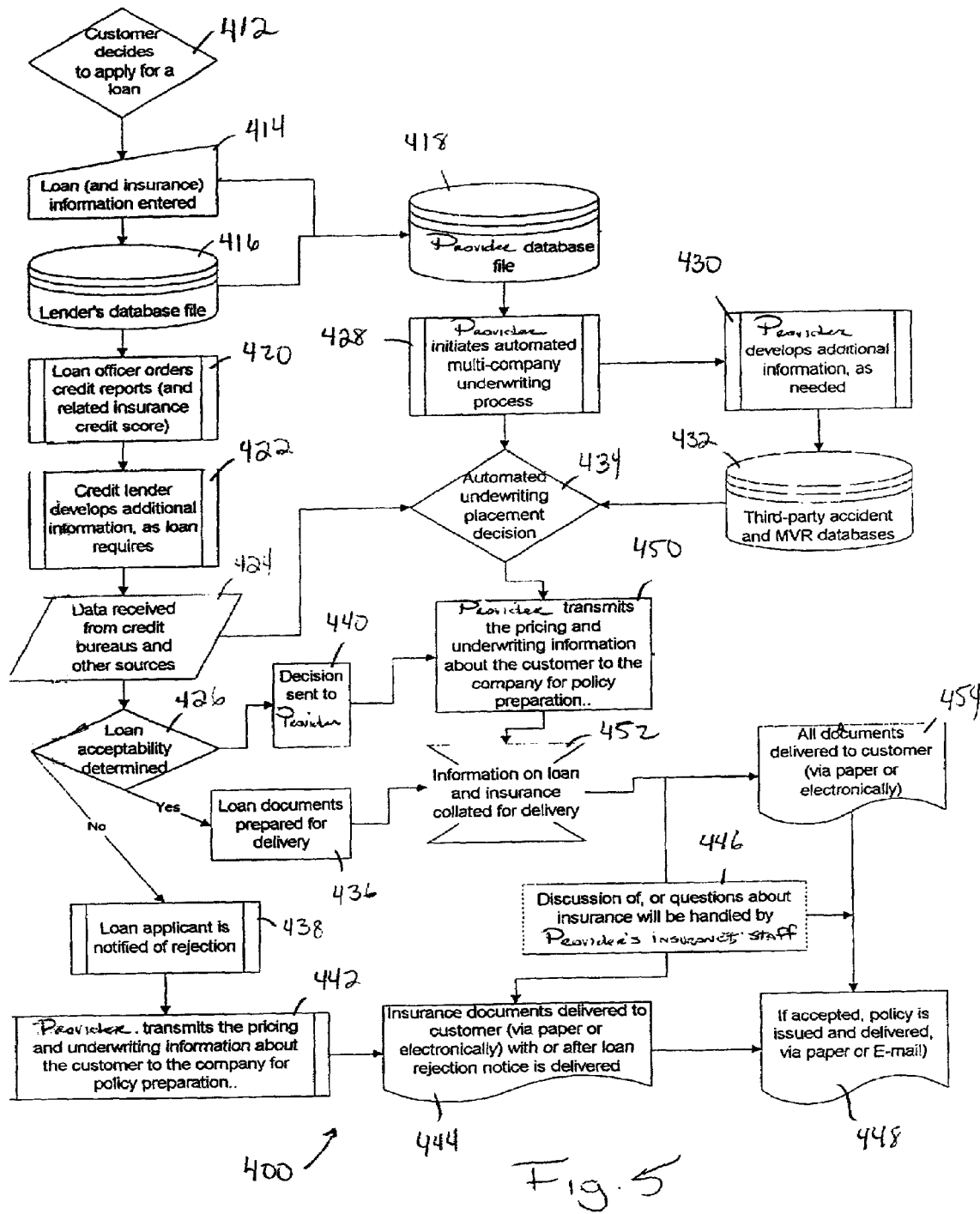
FIG. 5 is a flow chart of a fifth embodiment of the method of the present invention.

Referring to FIG. 5, the fifth embodiment of the present invention is generally designated by the reference numeral 400. Method 400 is provided for when one or more of the insurance companies involved wish to issue its own policy and/or maintain its own policy records.

Method 400 is initiated when a customer decides to apply for a loan, block 412. The consumer will contact a financial institution and complete a corresponding loan application. Permission is obtained from the customer to utilize the data on the loan application in order to generate an insurance quote for the customer. Permission may be obtained directly from the consumer or as part of the general authorization obtained as part of the loan application in process.

The loan, and hence insurance, data/information is entered, block 414, and downloaded into the potential lender's database file, block 416. If permission is obtained from the customer, the information may be downloaded into a providers database file, block 418, either directly or through the lender's database file.

As is conventional, a loan officer from the lender will order the necessary credit reports and their related insurance credit score, block 420. In addition, the credit lender will develop additional information as the loan requires, block 422. For example, a mortgage loan will require certain appraisals and/or inspections. An auto loan will require a vehicle valuation. Thereafter, the lender will receive data on the customer from various credit bureaus and other sources, block 424. Based upon the data in its possession, the lender through its loan officer determines the acceptability of the loan, block 426.

Using the information downloaded in the provider database file, the provider initiates an automated multi-company underwriting process, block 428. In other words, the provider utilizes electronic underwriting templates and rule-based underwriting to determine the amounts and on what terms each insurance company will accept the insurance risk. Simultaneously, the provider will develop additional information as needed to underwrite the insurance policy, block 430. For example, in an auto loan, the provider will obtain information on third party accident reports and the motor vehicle record of the customer, block 432. In addition, the provider will receive from the lender the data from the credit bureaus and other sources obtained as part of the loan application process. Utilizing the data obtained from the various sources, the provider underwrites the insurance risk, block 434.

If the loan is granted, the loan documents are prepared by the lender for delivery, block 436. If the loan is rejected, the customer is notified of the rejection, block 438. In any event, the decision of the lender is sent to the provider, block 440.

In the event that the loan is rejected, using the automated tools, the provider will still prepare pricing and underwriting information for the customer, but will transmit such information to the selected insurance company, block 442. The insurance documents containing the insurance quote are delivered to the customer via paper or electronically either with or after the loan rejection notice is delivered to the customer, block 444. Any discussion of or questions about the insurance documents or the insurance quote will be handled by the provider's insurance staff, block 446. If the insurance quote is accepted, the insurance policy is issued and delivered to the customer via paper or email, block 448. If the customer accepts the policy, coverage will be bound and the information needed to issue the policy will be forwarded by the provider to the insurance company. If the customer rejects the policy, the provider will attempt to place the policy elsewhere and the information needed to issue the policy will be retained in the provider's records.

Alternatively, if the loan is granted, the provider utilizes the automated underwriting tools to prepare pricing and underwriting information on the customer and transmits such information to the selected insurance company for preparation of the insurance quote and the insurance policy, block 450. Information on the accepted loan and the insurance quote are collated for delivery, block 452, and all the documents are delivered to the customer via paper or electronically, block 454. If the insurance quote is accepted by the customer, the insurance policy is issued and delivered to the customer via paper and email, block 448. As heretofore described, any discussion of or questions about the insurance documents or the insurance quote will be handled by the provider's insurance staff, block 446.

Various modes of carrying out the invention are contemplated as being within the scope of the following claims particularly pointing out and distinctly claiming the subject matter which is regarded as the invention.

We claim:

1. A method of generating an insurance quote for an applicant for a loan from a lender, wherein the loan is intended to fund the purchase of an item, comprising the steps of:

determining the acceptability of the loan;

obtaining data from a lender's database, wherein at least a portion of the data in the database is provided to the lender by the applicant in connection with obtaining the loan from the lender;

automatically underwriting an insurance risk for the item intended to be purchased using the loan;

generating the insurance quote utilizing the data obtained from the lender's database, the insurance quote is for the provision of insurance to cover the item intended to be purchased using the loan; and advising the applicant of the acceptability of the loan and providing the insurance quote to the applicant contemporaneously with the advising step if the loan has been accepted.

2. The method of claim 1 wherein the insurance quote is provided by the lender.

3. The method of claim 1 wherein the insurance quote is provided by an insurance provider.

4. The method of claim 1 wherein the step of underwriting the insurance risk includes the additional steps of:

providing a plurality of insurance companies for underwriting the insurance risk; and determining a set of terms for each of the plurality of insurance companies for which each of the plurality of insurance companies will accept the insurance risk.

5. The method of claim 4 comprising the additional step of selecting one of the sets of terms and providing the insurance quote in response thereto.

6. The method of claim 1 further comprising the additional step of determining if additional data is needed prior to underwriting the insurance risk and if the additional data is needed, conducting the step of obtaining the additional data from the applicant.

7. The method of claim 1 comprising the additional steps: storing the data after providing the insurance quote; and providing an additional insurance quote in response to a request by the applicant.

8. The method of claim 1 comprising the additional step of requesting permission from the applicant prior to obtaining the data from the lender.

9. The method of claim 1 wherein a second portion of the data is obtained from a third party.

10. The method of claim 9 wherein the third party is a credit bureau.

11. A method of generating an insurance quote for an applicant for a loan from a lender, wherein the loan is intended to fund the purchase of an item, comprising the steps of:

determining the acceptability of the loan;

obtaining data from a lender's database, wherein at least a first portion of the data in the database is provided to the lender by the applicant in order to obtain the loan;

automatically underwriting an insurance risk for the item intended to be purchased using the loan, using the data obtained from the lender's database, for a plurality of insurance companies;

selecting one of the plurality of insurance companies in response to the step of underwriting the insurance risk, and providing the same as a selected insurance company;

generating an insurance quote for the applicant from the selected insurance company for the provision of insurance to cover the item intended to be purchased using the loan; and providing the insurance quote and a determination of the acceptability of the loan to the applicant if the loan has been accepted.

12. The method of claim 11 wherein the insurance quote is provided by the lender.

13. The method of claim 11 wherein the insurance quote is provided by an insurance provider.

14. The method of claim 11 wherein the step of underwriting the insurance risk includes the additional step of determining a set of terms for each of the plurality of insurance companies under which each of the plurality of insurance companies will accept the insurance risk.

15. The method of claim 11 further comprising the additional step of determining if additional data is needed prior to underwriting the insurance risk and if the additional data is needed, conducting the step of obtaining the additional data from the applicant.

16. The method of claim 11 comprising the additional steps:

storing the data after providing the insurance quote; and providing an additional insurance quote in response to a request by the applicant.

17. The method of claim 11 comprising the additional step of requesting permission from the applicant prior to obtaining the data from the lender.

18. The method of claim 11 wherein a second portion of the data is obtained from a third party.

19. The method of claim 18 wherein the third party is a credit bureau.

20. A method of generating an insurance quote for an applicant for a loan from a lender, wherein the loan is intended to fund the purchase of an item, comprising the steps of:

determining the acceptability of the loan;

requesting permission from the applicant to provide the insurance quote for the item;

obtaining a first portion of data from a lender's database in response to permission to provide the insurance quote from the applicant, the first portion of the data being provided to the lender by the applicant in order to obtain the loan;

automatically determining if additional data is needed to underwrite an insurance risk for the item intended to be purchased using the loan and if the additional data is needed, conducting the step of obtaining the additional data;

automatically underwriting the insurance risk for the item intended to be purchased using the loan using the first portion of data for a plurality of insurance companies;

selecting one of the plurality of insurance companies in response to the step of underwriting the insurance risk and providing the same as a selected insurance company;

providing the insurance quote from the selected insurance company and a determination of the acceptability of the loan to the applicant if the loan has been accepted;

storing the data after providing the insurance quote; and providing an additional insurance quote in response to a request by the applicant.

21. The method of claim 20 wherein the insurance quote is provided by the lender.

22. The method of claim 20 wherein the insurance quote is provided by an insurance provider.

23. The method of claim 20 wherein the additional data is obtained from a third party.

24. The method of claim 23 wherein the third party is a credit bureau.

* * * * *